United States Patent [19]
Magill et al.

[11] Patent Number: 6,056,485
[45] Date of Patent: May 2, 2000

[54] RAMP PLUNGE AND FEED MILLING CUTTER

[75] Inventors: William C. Magill, Mentor, Ohio; Gary D. Baldwin, Ligonier, Pa.

[73] Assignee: Kennametal Inc., Latrobe, Pa.

[21] Appl. No.: 09/145,037

[22] Filed: Sep. 1, 1998

[51] Int. Cl.$^7$ .................................................... B23C 5/26
[52] U.S. Cl. .............................. 407/54; 407/56; 407/59; 408/230
[58] Field of Search .................. 407/54, 34, 42, 407/35, 43, 53, 59, 56; 408/210, 222, 230, 203.5, 211, 229

[56] References Cited

U.S. PATENT DOCUMENTS

| | | |
|---|---|---|
| Re. 28,416 | 5/1975 | Hougen . |
| 2,355,965 | 8/1944 | Frishette .................................. 408/230 |
| 2,377,329 | 6/1945 | Dettmer .................................. 408/229 |
| 2,557,751 | 6/1951 | Melzer .................................... 408/211 |
| 2,682,792 | 7/1954 | Donnelly ..................................... 77/72 |
| 2,782,490 | 2/1957 | Graves . |
| 3,037,264 | 6/1962 | Mossberg ................................. 29/106 |
| 3,765,789 | 10/1973 | Hougen .................................. 408/230 |
| 3,811,163 | 5/1974 | Frederick et al. ........................ 408/59 |
| 4,285,618 | 8/1981 | Shanley ..................................... 407/54 |
| 5,094,573 | 3/1992 | Hougen .................................. 409/132 |
| 5,190,420 | 3/1993 | Kishimoto ................................. 407/54 |
| 5,580,196 | 12/1996 | Thompson ............................... 408/145 |
| 5,810,524 | 9/1998 | Wirth ................................... 408/203.5 |
| 5,893,683 | 4/1999 | Johnson ................................... 407/42 |

FOREIGN PATENT DOCUMENTS

| | | |
|---|---|---|
| 352224 | 1/1990 | European Pat. Off. . |
| 313494 | 2/1918 | Germany . |
| 02053511 | 2/1990 | Japan . |
| 172441 | 4/1992 | Russian Federation . |
| 93/00192 | 1/1993 | WIPO . |

OTHER PUBLICATIONS

Copy of International Search Report, mailed Nov. 22, 1999, in Application No. PCT/US99/17643, filed Aug. 03, 1999.
"Carbide End Mills for N/C Machining"Iron Age, vol. 198, No. 17, 1966, (1966–11–17) p. 152.

*Primary Examiner*—Henry W. H. Tsai
*Attorney, Agent, or Firm*—Larry R. Meenan

[57] ABSTRACT

A ramp, plunge and feed milling cutter having a cylindrical body with cutting ribs protruding beyond the length of the cylindrical body to define a cavity. The integral single-piece construction of the milling cutter permits the fabrication of small diameter plunge milling cutters having sufficient strength in the cutting rib adjacent the cavity to withstand the forces of a machining operation.

23 Claims, 5 Drawing Sheets

RAMP PLUNGE AND FEED MILLING CUTTER

BACKGROUND OF THE INVENTION

1. Field of the Invention

The invention relates to a milling cutter and, more particularly, to a ramp, plunge and feed milling cutter for use on high strength, thermal resistant metals such as, for example, titanium alloys, nickel based alloys and cobalt based alloys capable of generating a cavity in the workpiece utilizing one or all of a ramping, plunging or feeding motion.

2. Description of the Background Art

In the past, end mills were used exclusively for motion within a single plane relative to a workpiece. To produce a slot in the workpiece, an initial hole was produced using a drill. An end mill was then introduced into the drilled hole to elongate the hole, thereby producing a slot. This procedure required two separate cutting tools—a drill and an end mill—along with two separate cutting operations.

Some small diameter solid end mills are capable of producing slots within a workpiece. Such end mills have diameters ranging from one-half inch to two inches in diameter and have the capability of machining on their "end" as well as along the side of the end mill.

As illustrated in FIG. 1, an end mill 10 is used to machine a pocket 15 by plunging the end mill 10 into a workpiece 20 a short distance during which a face 25 of the milling cutter actively performs the cutting. An end 30 of the pocket 15 illustrates the distance of the plunge relative to a previous pass illustrated at portion 35. The end mill 10 is then moved in a transverse direction to mill a slot 40 which is the width of the end mill 10 diameter during which a side 45 of the mill 10 actively performs the cutting. Since the slotting operation imposes a very high bending load on the milling cutter, the end mill cannot be plunged deeper than 20% of the mill diameter.

Once the slot 40 is cut the length of the pocket, additional transverse passes of the end mill 10 are made to widen the slot 40 with each pass removing a swath having a width W of approximately one-tenth to one-half the diameter of the end mill. After the slot 40 has been widened to the appropriate dimension of the pocket, the steps are again repeated to plunge a deeper hole, slot the hole and then widen the slot. This procedure is repeated until the desired depth of the pocket is obtained.

Typical end mills used for such an application resemble a twist drill with a flat tip. Milling operations using this type of a tool are the slowest to perform since the full diameter of the milling cutter is being worked to produce a flat floor in the slot.

Indexable inserts are also used on milling cutters for the purpose of providing ramp, plunge and feed capabilities. U.S. Pat. No. 3,811,163 entitled "Plunge Milling Tool" discloses a milling cutter utilizing indexable inserts for performing pocket milling. However, for milling cutters having a two inch diameter or less, such a design is difficult because of space limitations on the milling cutter body. Furthermore, when a milling cutter of this design is made to such a small diameter, the strength of the milling cutter body near the inserts is diminished and may not provide sufficient strength to endure the high forces present in a pocket milling operation.

A milling cutter design is needed having a small diameter suitable for pocket milling operations and furthermore having suitable strength for high metal removal operations.

SUMMARY OF THE INVENTION

The invention is directed to a milling cutter having a generally cylindrical body with a longitudinal axis, an upper end and a lower end. The body has a plurality of radially extending, circumferentially spaced, integral cutting ribs along the length of the body. The milling cutter also has a shank extending from the upper end for mounting the cutter on a rotary driving member. Each cutting rib is comprised of a body portion extending along the length of the body and a cantilevered portion extending from the body portion beyond the lower end of the body to create a cavity. Furthermore, each cutting rib has an outer radius along the body portion and cantilevered portion, an inner radius along the cantilevered portion, an outer cutting edge at the outer radius, an inner cutting edge at the inner radius, and a bottom cutting edge at the cantilevered portion of the rib extending between the outer and inner cutting edges.

Other objects and advantages of the present invention will become apparent and obvious from a study of the following description and the accompanying drawings which are merely illustrative of such invention.

DETAILED DESCRIPTION OF THE INVENTION

Figure 2:
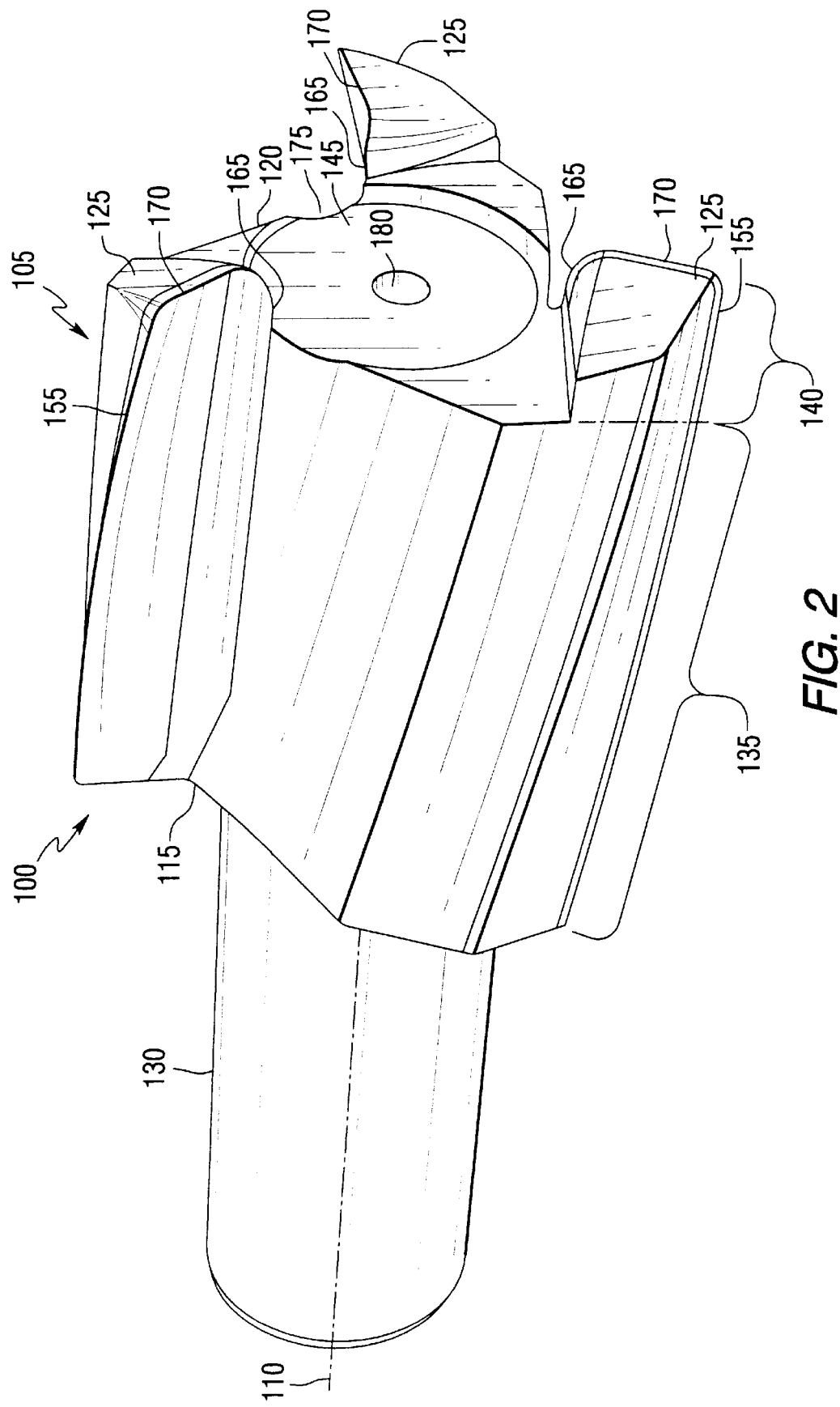
FIG. 2 is a perspective view of the milling cutter in accordance with the subject invention.

FIGS. 2–6 illustrate a milling cutter 100 of the present invention. As illustrated in FIG. 2, the milling cutter 100 is comprised of a generally cylindrical body 105 with a longitudinal axis 110, an upper end 115 and a lower end 120. The body 105 has a plurality of radially extending, circumferentially spaced cutting ribs 125 along the length of the body 105. A shank 130 extends from the upper end 115 for mounting the cutter on a rotary driving member (not shown). Each cutting rib 125 is comprised of a body portion 135 extending along the length of the body 105 and a cantilevered portion 140 extending from the body portion 135 beyond the lower end 120 of the body 105 to create a cavity 145. While for purposes of discussion only a single rib 125 will be discussed, it should be appreciated this discussion will apply equally to all ribs 125 on the milling cutter 100.

Each cutting rib 125 has an outer radius 150 (FIG. 4) extending along both the body portion 135 (FIG. 2) and cantilevered portion 140 of the rib 125 to define an outer cutting edge 155. The diameter size of the milling cutter 100 is identified by the diameter of the circle identified with reference numeral 157. Each cutting rib 125 furthermore has an inner radius 160 (FIG. 4) extending along the cantilevered portion 140 to define an inner cutting edge 165. The cutting rib 125 further has a bottom cutting edge 170 (FIG. 2) at a portion of the rib 125 generally perpendicular to the longitudinal axis 110 and extending radially between the outer cutting edge 155 and the inner cutting edge 165. Each rib 125 is circumferentially spaced from an adjacent rib with a flute 175 extending into the cylindrical body 105. While in most instances the ribs 175 will be symmetrically positioned about the body 105, in certain instances the ribs 175 may intentionally be positioned assymetrically. When the ribs 175 are positioned in this fashion, it may be necessary to balance the cutter 100 for high speed operation. As indicated in FIG. 5, each rib 125 may extend along a line at an angle α relative to the longitudinal axis 110 thereby defining helical flutes. The angle α may be between −30° and −60° depending on the machining operation to be performed. As an example, it has been found that, for machining titanium, an α angle of approximately 30° is preferred.

The cylindrical body 105 of the subject invention is machined from a single piece of material using grinding techniques known to those skilled in the art of grinding. This arrangement is ideal for end mills having a diameter less than two inches because it eliminates the need to manufacture small parts which may be fragile but, more importantly, eliminates the need to machine a pocket in the cantilevered portion 140 of the rib 125 to accept an indexable insert. Such a pocket requires removal of material from the cantilevered portion 140 which tends to diminish the structural integrity of the cantilevered portion 140.

The cylindrical body 105 may be made of a material such as cemented carbide or high speed steel. In the event the cylindrical body 105 is made from cemented carbide and the shank 130 is made from a high speed steel, then the shank 130 may be attached to the cylindrical body 105 through brazing or any number of techniques known to those skilled in connecting such materials. The cutting edges 155, 165 and 175 may be ground or honed for added edge strength using techniques known to those skilled in the art of metalworking.

Figure 3:
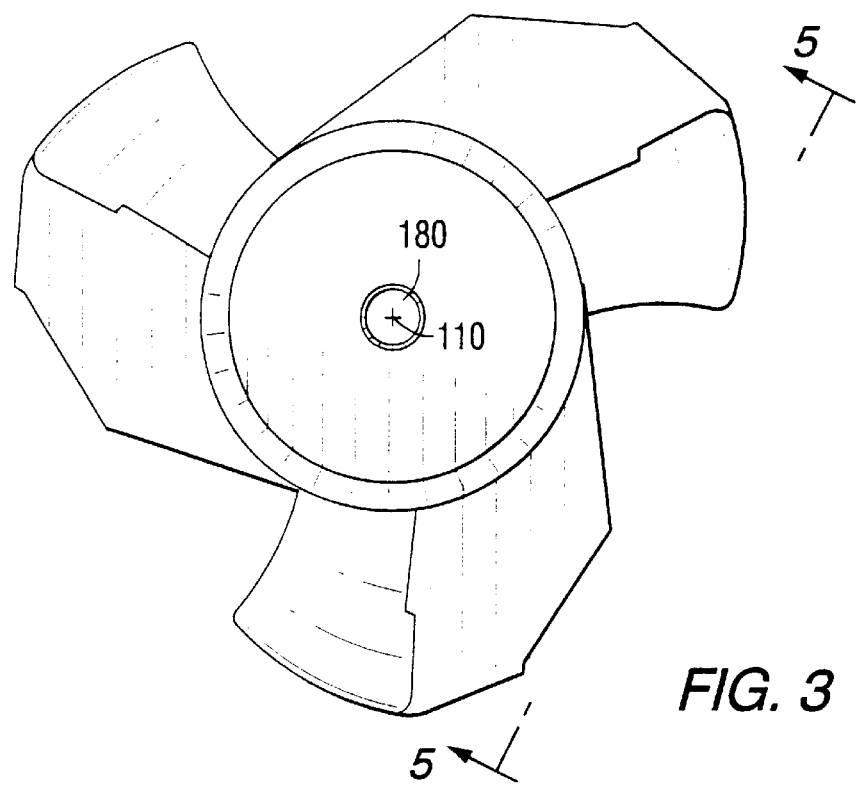
FIG. 3 is a top view of the milling cutter as viewed from the left side of FIG. 2.
Figure 4:
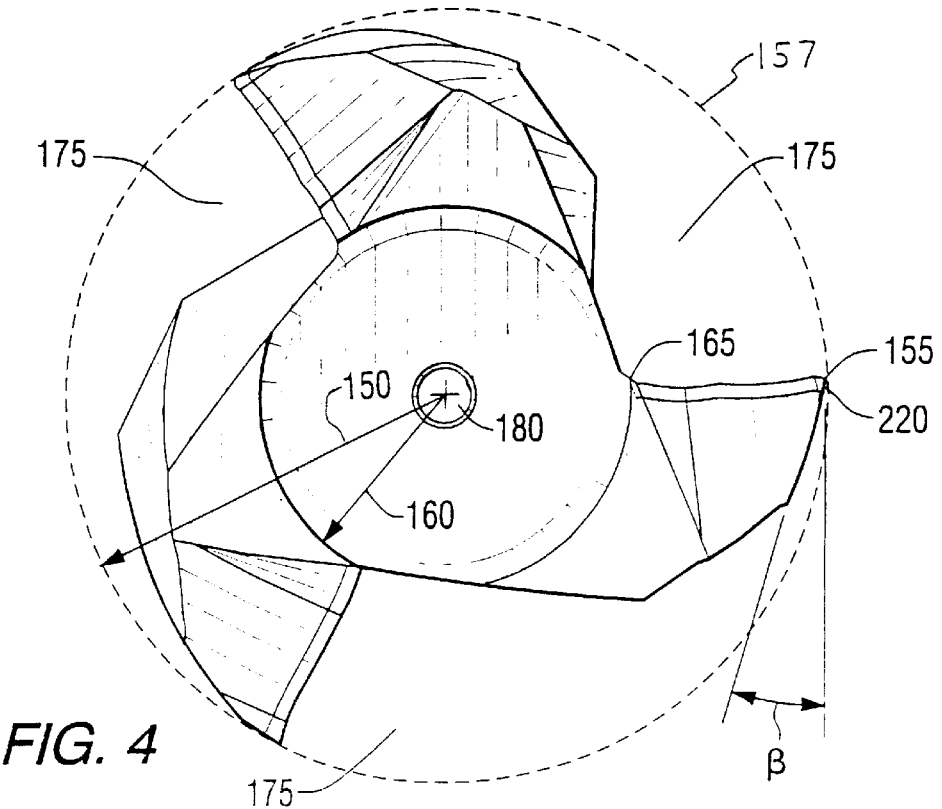
FIG. 4 is a bottom view of the milling cutter as viewed from the right side in FIG. 2.
Figure 5:
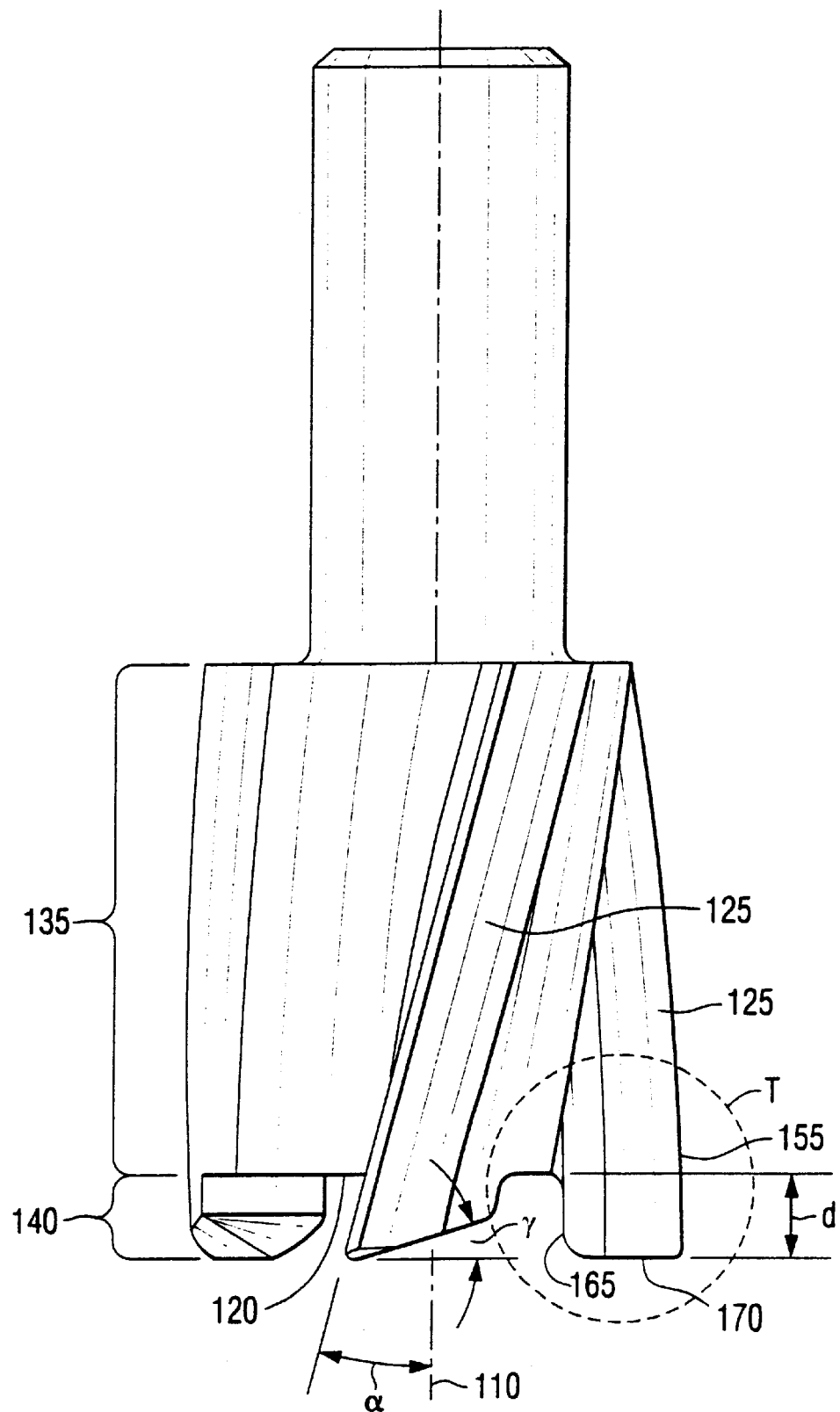
FIG. 5 is a side view of the milling cutter taken along arrows 5—5 in FIG. 3.

As illustrated in FIGS. 2, 3 and 4, the milling cutter 100 may have a bore 180 extending along the longitudinal axis 110 through the shank 130 and the cylindrical body 105. This bore 180 may act as a passageway for coolant or, in the alternative, for air which would promote chip ejection from the workpiece.

To reduce interference between the cylindrical body 105 of the milling cutter 100 and the workpiece (not shown), a radial clearance is provided behind the outer cutting edge 155 as illustrated by β in FIG. 4. The radial clearance angle β may be between 7° and 25° and preferably is approximately 10°. To provide additional support to the outer cutting edge 155, a flat 220 is immediately behind the outer cutting edge 155 and has an angle smaller than β.

Additionally, the bottom cutting edge 170 has a clearance behind it relative to the bottom of the cutter 100 indicated by the angle γ in FIG. 5. The axial clearance angle may be between 7° and 25°, however, is preferably approximately 10°.

A depth d of the cavity 145 is determined as illustrated in FIG. 5 by the distance between the lower end 120 of the cylindrical body 105 and the bottom cutting edge 170 which is the distance the cantilevered portion 140 extends beyond the body portion 135. The depth d may be between 0.100 and 0.250 inches.

The outer cutting edge 155 as viewed in FIG. 5 may have a convex, concave or straight profile depending upon the shape to be imparted to the workpiece.

In order to effectively distribute coolant from the rotary driving member to the flutes 175, the bore 180 may be utilized. However, it is entirely possible, in addition to or in lieu of the bore 180, to include on the shank 130 a groove (not shown) extending along the outer surface of the shank 130 parallel to a flute 175 to provide a path for coolant to at least one flute 175 when the shank is secured within a rotary driving member. In this situation, it is necessary for the outer radius of the shank to equal the smallest radius of the flute 175 in the region the coolant is introduced.

Figure 1:
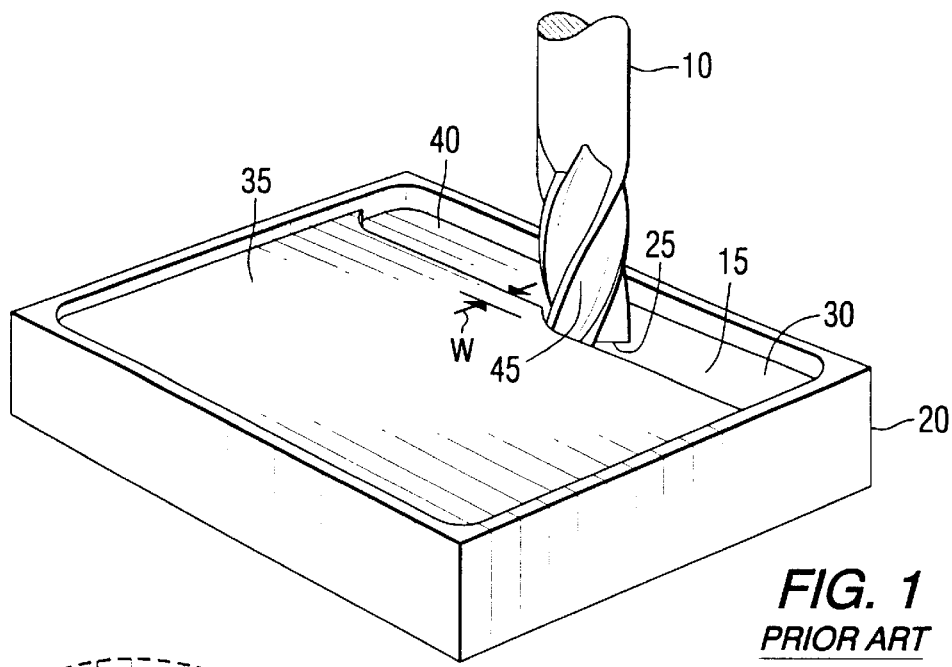
FIG. 1 is prior art and illustrates the operation of an end mill to generate a pocket.
Figure 6A:
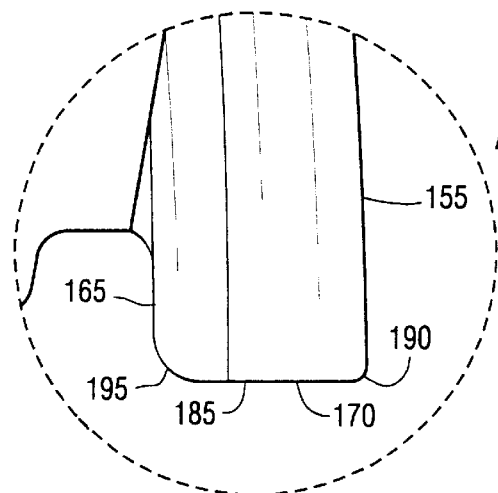
FIGS. 6A–6C are illustrations of some of the possible configurations for the end circled as "T" in FIG. 5 of the milling cutter of the present invention.

While the configuration of the outer cutting edge 155 is typical of many end mills, a variety of geometries may be used for both the inner cutting edge 165 and the bottom cutting edge 170. FIGS. 6A, B and C illustrate a variety of different configurations for the area of the outer cutting edge 155, the inner cutting edge 165 and the bottom cutting edge 170 represented in FIG. 5 by the circle labeled "T."

Figure 6B:
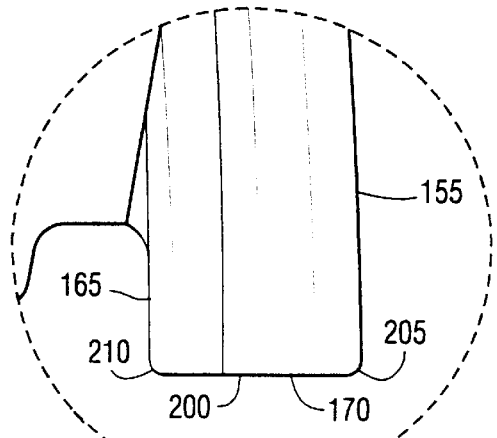
Figure 6C:
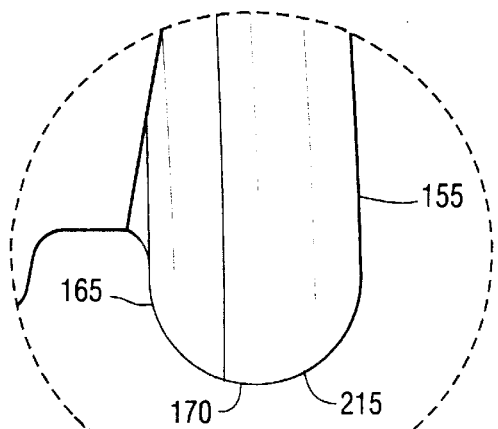

In FIG. 6A, bottom cutting edge 170 is defined by a straight line 185 between the outer cutting edge 155 and the inner cutting edge 165. However, it is connected to adjacent cutting edges by a radiused corner 190 and a second radiused corner 195 each having different curvature. FIG. 6B illustrates a bottom cutting edge 170 defined by a straight line 200 extending between the inner cutting edge 165 and outer cutting edge 155 connected with radiused corners 205 and 210. FIG. 6C illustrates a bottom cutting edge 170 defined by a curve 215 between the outer cutting edge 155 and the inner cutting edge 165. The curvature of any of the radii discussed may range from one sixty-fourth of an inch to a full radius which connects the inner cutting edge 165 with the outer cutting edge 155. It should be appreciated the configuration of the cutting edges 155, 165 and 170 along with the connecting corners may have any number of different geometries, and FIGS. 6A, 6B and 6C are only illustrative of these geometries.

Figure 7A:
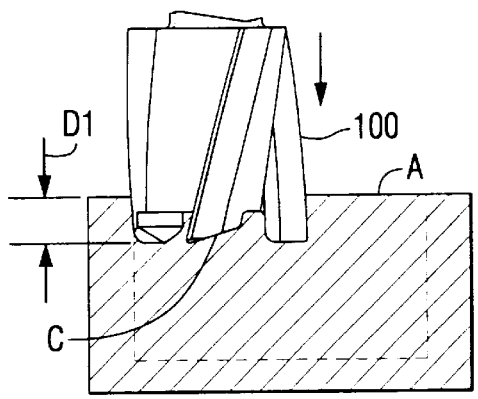
FIGS. 7A–7D are section views of a workpiece at various stages being milled using the present invention.
Figure 8A:
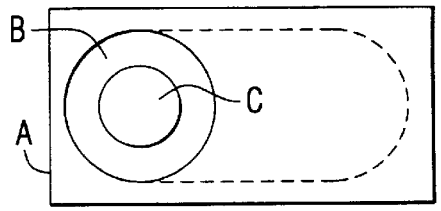
FIGS. 8A–8D are top plan views of the same workpiece at various stages being milled using the present invention.
Figure 7B:
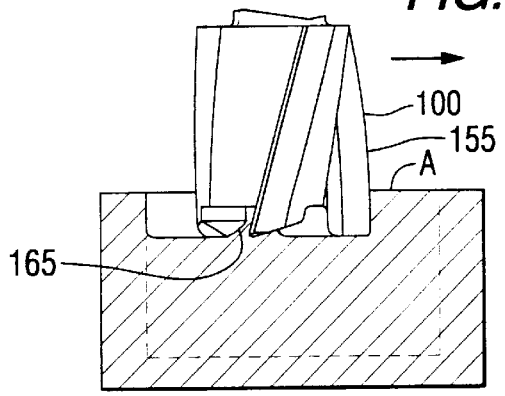
Figure 8B:
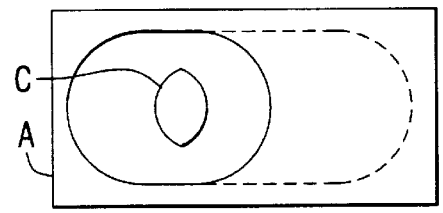
Figure 7C:
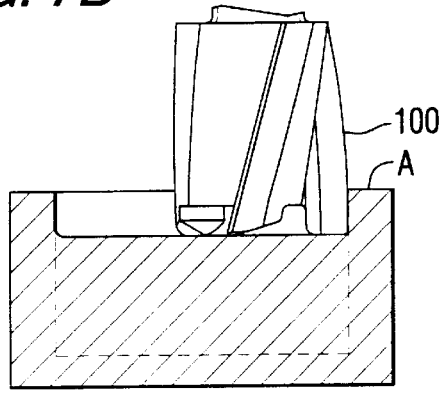
Figure 8C:
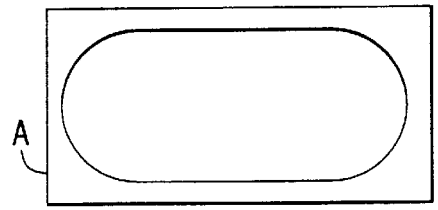
Figure 7D:
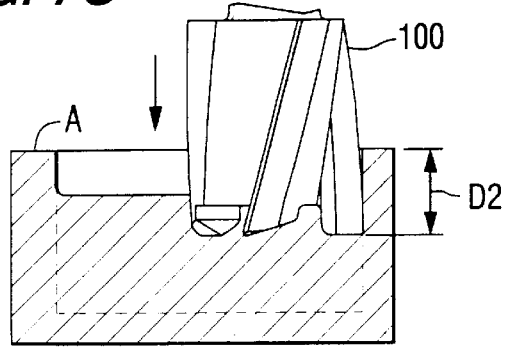
Figure 8D:
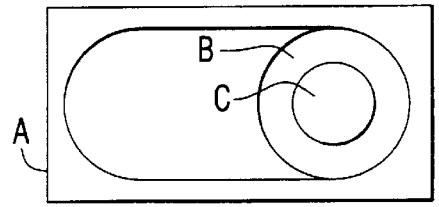

Referring now to FIGS. 7A–7D and 8A–8D, utilization of the milling cutter 100 of the present invention is illustrated. More particularly, these Figures illustrate how a milling cutter 100 can be used to mill a pocket (shown in dotted lines) in a workpiece A. The milling cutter 100 is first fed axially into the workpiece A to a predetermined depth d1 as shown in FIG. 7A. During axial feeding of the milling cutter 100, an annular groove B is formed in the workpiece A as shown in FIG. 8A. A core C of material is left inside the annular groove B. After feeding the milling cutter 100 to the predetermined depth d1, the milling cutter 100 is fed laterally as shown in FIG. 7B. As the milling cutter 100 is moved laterally, the outer cutting edges 155 will be engaged and the inner cutting edges 165 will also be engaged. After traveling laterally a distance equal to the diameter of the milling cutter 100, the entire core C will be removed. The milling cutter 100 will continue to move laterally until a groove of the desired length is made, as shown in FIGS. 7C and 8C. The milling cutter 100 is then fed axially into the workpiece A to a predetermined depth d2 as shown in FIGS. 7D and 8D. The milling cutter 100 is then moved back toward its original starting point in a direction perpendicular to the axis of the milling cutter 100. The sequence can be repeated as many times as necessary to mill a pocket of any predetermined depth. The milling cutter 100 can also be moved back and forth in a plane to form a pocket wider than the diameter of the cutter 100. Also, the cutter 100 can be simultaneously moved axially and radially in three dimensions to form an incline or ramp in the workpiece A or to form a cavity by axially feeding the cutter 100 while simultaneously moving the cutter 100 in a circle interpolation pattern.

Based upon the foregoing, it is apparent that the milling cutter 100 of the present invention can be used to rapidly remove material from a large workpiece in a single operation. The milling cutter 100, due to the shape and increased strength, can make greater depth of cut than conventional milling cutters, requiring fewer passes to mill a pocket of a predetermined size and depth.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A milling cutter comprising:
   a) a generally cylindrical body with a longitudinal axis, an upper end and a lower end, said body having a plurality of radially extending, circumferentially spaced, integral cutting ribs along the length of the body;
   b) a shank extending from the upper end for mounting the cutter on a rotary driving member;
   c) wherein each cutting rib is comprised of a body portion extending along the length of the body and a cantilevered portion extending from the body portion beyond the lower end of the body to create a cavity; and
   d) wherein each cutting rib has
      i) an outer radius from the longitudinal axis to the perimeter of the milling cutter along the body portion and cantilevered portion;
      ii) an inner radius from the longitudinal axis to the cantilevered portion;
      iii) an outer cutting edge at the outer radius;
      iv) an inner cutting edge at the inner radius; and
      v) a bottom cutting edge at the cantilevered portion of the rib extending between the outer and inner cutting edges, wherein the cantilevered portion of the cutting rib extends beyond the body portion approximately 0.100–0.250 inches.

2. The milling cutter according to claim 1 wherein each rib is circumferentially spaced from an adjacent rib with a flute.

3. The milling cutter according to claim 2 wherein each rib extends along a line at an angle relative to the longitudinal axis to define helical flutes.

4. The milling cutter according to claim 3 wherein the angle is between 15–60°.

5. The milling cutter according to claim 4 wherein the angle is approximately 30°.

6. The milling cutter according to claim 1 wherein the body is cemented carbide.

7. The milling cutter according to claim 6 wherein the body is attached to a shank made of high speed steel.

8. The milling cutter according to claim 1 wherein the body and shank are each made of high speed steel.

9. The milling cutter according to claim 1 wherein the outer diameter of the body is less than 2.0 inches.

10. The milling cutter according to claim 1 wherein a bore extends along the longitudinal axis through the shank and the body.

11. A milling cutter comprising:
    a) a generally cylindrical body with a longitudinal axis, an upper end and a lower end, said body having a plurality of radially extending, circumferentially spaced, integral cutting ribs along the length of the body;
    b) a shank extending from the upper end for mounting the cutter on a rotary driving member;
    c) wherein each cutting rib is comprised of a body portion extending along the length of the body and a cantilevered portion extending from the body portion beyond the lower end of the body to create a cavity; and
    d) wherein each cutting rib has
       i) an outer radius from the longitudinal axis to the perimeter of the milling cutter along the body portion and cantilevered portion;
       ii) an inner radius from the longitudinal axis to the cantilevered portion;
       iii) an outer cutting edge at the outer radius;
       iv) an inner cutting edge at the inner radius; and
       v) a bottom cutting edge at the cantilevered portion of the rib extending between the outer and inner cutting edges, wherein the bottom cutting edge is defined by a curve between the outer and inner radii.

12. The milling cutter according to claim 1 wherein the bottom cutting edge is defined by a straight line extending between the inner and outer radii.

13. The milling cutter according to claim 12 wherein the bottom cutting edge intersects with the inner and outer cutting edges along a segment having a radius.

14. The milling cutter according to claim 13 wherein the radius is greater than the $3/16$ inches.

15. The milling cutter according to claim 1 wherein the cutting rib has a radial clearance angle $\beta$.

16. The milling cutter according to claim 15 wherein the radial clearance angle $\beta$ is between 7–25°.

17. The milling cutter according to claim 16 wherein the radial clearance angle $\beta$ is approximately 10°.

18. The milling cutter according to claim 15 further including a flat behind the cutting rib outer cutting edge.

19. The milling cutter according to claim 1 wherein the cutting rib has an axial clearance angle $\gamma$.

20. The milling cutter according to claim 18 wherein the axial clearance angle $\gamma$ is 7–25°.

21. The milling cutter according to claim 20 wherein the axial clearance angle $\gamma$ is approximately 10°.

22. A milling cutter comprising:
    a) a generally cylindrical body with a longitudinal axis, an upper end and a lower end, said body having a plurality of radially extending, circumferentially spaced, integral cutting ribs along the length of the body;
    b) a shank extending from the upper end for mounting the cutter on a rotary driving member;
    c) wherein each cutting rib is comprised of a body portion extending along the length of the body and a cantilevered portion extending from the body portion beyond the lower end of the body to create a cavity; and
    d) wherein each cutting rib has
       i) an outer radius from the longitudinal axis to the perimeter of the milling cutter along the body portion and cantilevered portion;
       ii) an inner radius from the longitudinal axis to the cantilevered portion;
       iii) an outer cutting edge at the outer radius;
       iv) an inner cutting edge at the inner radius; and
       v) a bottom cutting edge at the cantilevered portion of the rib extending between the outer and inner cutting edges, wherein the outer radius of the shank is equal to the smallest radius of the flute.

23. A milling cutter comprising:
    a) a generally cylindrical body with a longitudinal axis, an upper end and a lower end, said body having a plurality of radially extending, circumferentially spaced, integral cutting ribs along the length of the body;

b) a flute between each cutting rib extending along a line at an angle relative to the longitudinal axis;
c) a shank extending from the upper end for mounting the cutter on a rotary driving member;
d) wherein each cutting rib is comprised of a body portion extending along the length of the body and a cantilevered portion extending from the body portion beyond the lower end of the body to create a cavity; and
e) wherein each cutting rib has
   i) an outer radius along the body portion and cantilevered portion;
   ii) an inner radius along the cantilevered portion;
   iii) an outer cutting edge at the outer radius;
   iv) an inner cutting edge at the inner radius; and
   v) a bottom cutting edge at the cantilevered portion of the rib extending between the outer and inner cutting edges and connected thereto by segments having radii of at least 3/16 inches, wherein the cantilevered portion of the cutting rib extends beyond the body portion approximately 0.100–0.250 inches.

* * * * *